US012011915B2

(12) United States Patent
Huffman et al.

(10) Patent No.: US 12,011,915 B2
(45) Date of Patent: Jun. 18, 2024

(54) ROTARY SCREEN PRINTING APPARATUS AND PROCESS

(71) Applicant: Temptime Corporation, Morris Plains, NJ (US)

(72) Inventors: Brian S. Huffman, Belle Mead, NJ (US); Mohannad Abdo, Clifton, NJ (US); Robert Reilly, Columbia, NJ (US)

(73) Assignee: TEMPTIME CORPORATION, Morris Plains, NJ (US)

( * ) Notice: Subject to any disclaimer, the term of this patent is extended or adjusted under 35 U.S.C. 154(b) by 0 days.

(21) Appl. No.: 17/947,927

(22) Filed: Sep. 19, 2022

(65) Prior Publication Data

US 2024/0109282 A1 Apr. 4, 2024

(51) Int. Cl.
*B41F 15/38* (2006.01)
*B41F 15/40* (2006.01)

(52) U.S. Cl.
CPC .............. *B41F 15/40* (2013.01); *B41F 15/38* (2013.01)

(58) Field of Classification Search
CPC ...... B41F 15/38; B41F 15/40; B41F 15/0854; B41F 15/0809; B41F 15/0836
See application file for complete search history.

(56) References Cited

U.S. PATENT DOCUMENTS

| | | | |
|---|---|---|---|
| 4,693,179 | A | 9/1987 | Watts |
| 5,772,763 | A | 6/1998 | Himes, Jr. et al. |
| 2006/0193985 | A1 | 8/2006 | McNeil et al. |
| 2008/0105146 | A1 | 5/2008 | Komuro et al. |
| 2011/0079156 | A1 | 4/2011 | Bartesaghi |

FOREIGN PATENT DOCUMENTS

| | | |
|---|---|---|
| DE | 2259225 | 6/1973 |
| NL | 1030670 | 6/2007 |
| WO | WO 85/03672 | 8/1985 |

OTHER PUBLICATIONS

Search Report and Written Opinion dated Nov. 20, 2023 issued for International PCT Application No. PCT/US2023/032474.

*Primary Examiner* — Christopher E Mahoney
*Assistant Examiner* — Marissa Ferguson-Samreth
(74) *Attorney, Agent, or Firm* — K&L Gates LLP

(57) ABSTRACT

The present disclosure is directed to a rotary screen printing apparatus, comprising: a rotary cylindrical screen; a conduit which provides fluid communication to an internal volume of the rotary cylindrical screen; and, a heater whose output is directed towards the conduit.

17 Claims, 5 Drawing Sheets

ROTARY SCREEN PRINTING APPARATUS AND PROCESS

FIELD

The present disclosure is generally directed to a rotary screen printing apparatus. More particularly, the present disclosure is generally directed to a rotary screen printing apparatus which may be used to print molten coating materials on a substrate.

BACKGROUND

A variety of methods to deliver printable materials exist. As compared to flood coating, printing offers the advantages of selective placement of the material with a concomitant reduction of waste.

Printing methods can be classified into two broad types, specifically non-contact (impactless) and contact (impression) printing. Non-contact printing methods encompass processes in which little or minimal contact is made with the substrate and include inter alia electrophotography, thermal imaging, jet printing and electrographic methods. In contrast, contact printing encompasses processes in which an image is transferred through direct contact between the printing plate or image carrier and a substrate. Contact printing methods include lithography, gravure, flexography and screen printing.

Screen-printing is a popular contact printing method based on the relative simplicity of both the printing process and equipment and based on the variety of substrates that can be imprinted. The screen panting process first involves making a stencil on a screen mesh that defines the pattern, text or image that is to be printed on a particular surface of the substrate. Once the screen is prepared, a coating material—such as an ink—is squeezed through the apertures of the stenciled mesh to transfer the pattern or image to this surface. As a final step, the coating material must be dried or otherwise fixed to prevent the distortion and preserve the integrity of the printed pattern or image.

Screen printable coating materials must possess a balance of rheological properties that permits both sufficient fluid flow when extruded through the apertures of the screen mesh during the printing process and adequate resistance to flow to prevent smearing or soak through of the printed pattern. Such rheological characteristics can be expressed in terms of the viscosity and yield point of the coating material. Viscosity is generally defined as the material's relative resistance to continual shear or flow: when the viscosity of the material is too low, excessive flow following printing causes poor image resolution. On the other hand, a coating material having too high a viscosity flows unevenly through the screen, potentially yielding a poor transfer of the image or pattern to the target surface.

The yield point represents the materials relative resistance to initial shear. Fluids having an acceptable yield point for screen-printing possess high apparent viscosity when stationary but readily flow when exposed to shear forces. Part of the poor transfer of the image associated with high viscosity materials is due to stringing, whereby visible strands of material form as the screen is removed from its contact with the substrate.

There are two main types of screen printing: flat-bed screen printing; and, rotary screen printing. Flat-bed screen printing can be manual or automatic. Conversely rotary screen printing—which is the subject of the present application—is typically automatic and provides high printing productivity. In this method, the rotary screen has a cylindrical form. The coating material is applied from inside the cylinder while the rotary screen is revolving. The screen rotates into contact with the substrate and the coating material is fed from inside the screens. The material is forced from out of the inside of the screen and through apertures using a squeegee.

Rotary screen printing presents the advantages of fast production rates, ease of setting up and reduced dependence upon experience for a successful operation. Rotary cylindrical screens having a broad range of circumferences are also available: the size of the print-design repeat is dependent upon said circumference and variance of this may be facilely achieved. Further, computer-aided design techniques and additive manufacturing are now being utilized to create complex configurations for the apertures of the rotary cylindrical screens which serves to expand the utility of this method of printing.

SUMMARY

In accordance with a first aspect of the present disclosure, there is provided an embodiment of a rotary screen printing apparatus, including:

- a rotary cylindrical screen;
- a conduit which provides fluid communication to an internal volume of the rotary cylindrical screen; and,
- a heater whose output is directed towards the conduit.

In some exemplary embodiments, the apparatus may further include a heat sensor to detect one of: a temperature of the conduit; a temperature of the fluid passing through the conduit; or, a temperature of the fluid discharged from the conduit to the internal volume of the rotary cylindrical screen. In some embodiments, the heat sensor is disposed within the conduit. In some embodiments, the heat sensor is disposed on an external surface of the conduit.

When the apparatus includes a heat sensor, it may in some embodiments further include a controller in communication with the heat sensor and the heater to control the heater so that the temperature of fluid passing through the conduit remains at or above a pre-determined minimum temperature.

In accordance with a second aspect of the disclosure, there is provided a rotary screen printing device including:

- a reservoir to hold a coating composition;
- a first heater to heat and liquefy the coating material held in the reservoir;
- a first heat sensor coupled to the reservoir;
- a rotatable cylindrical screen having an internal volume and an array of apertures there through;
- a squeegee fixedly disposed in the internal volume of the cylindrical screen so that the squeegee does not rotate within the cylindrical screen when the cylindrical screen is rotated;
- a conduit providing fluid communication of the coating material between the reservoir and the internal volume of the rotatable cylindrical screen;
- a second heater to heat the conduit;
- a second heat sensor to detect one of the temperature of the conduit, the temperature of the liquefied coating material passing through the conduit or the temperature of the liquefied coating material discharged from the conduit to the internal volume of the rotary cylindrical screen;
- a controller in communication with the first and second heat sensors and the first and second heaters to control the first heater so that the temperature of the coating material held in the reservoir has a predetermined temperature ($T_R$) above the liquification point of the coating material and to control the second heater so that the coating material maintains a second predetermined temperature ($T_C$) above the solidification point of the liquefied coating material as it passes through the conduit. The rotary screen printing device may further include an agitator disposed within the reservoir.

In some embodiments, the second heat sensor is disposed within the conduit. In some embodiments, the second heat sensor is disposed on an external surface of the conduit.

In some embodiments of the rotary screen printing device, $T_C$ is lower than $T_R$. Alternatively or additionally, $T_C$ may be lower than the liquification point of the coating material.

In some embodiments, the pre-determined temperature of coating material in the reservoir ($T_R$) is from 0.1 to 5° C., for example from 0.1 to 2° C. or from 0.1 to 1° C. above the liquification point of the coating material.

In some embodiments, the pre-determined temperature of coating material in the conduit ($T_C$) is from 0.1 to 2° C., for example from 0.1 to 1° C. or from 0.1 to 0.5° C. above the solidification point of the coating material.

In some embodiments, the rotary screen printing device further includes:

a second reservoir to hold a second coating material in which is optionally disposed an agitator;

a third heater to heat and liquefy the second coating material held in the second reservoir;

a third heat sensor coupled to the second reservoir;

a second conduit providing fluid communication of the liquefied second coating material between the second reservoir and the internal volume of the rotary cylindrical screen;

a fourth heater to heat the second conduit; and, a fourth heat sensor to detect one of the temperature of the second conduit, the temperature of the liquefied second coating material passing through the second conduit or the temperature of the liquefied second coating material discharged from the second conduit to the internal volume of the rotary cylindrical screen, wherein the controller is further in communication with the third and fourth sensors and the third and fourth heaters to control the third heater so that the second coating material held in the second reservoir has a third predetermined temperature ($T_{2R}$) above the liquification point of the second coating material and to control the fourth heater so that the second coating maintains a fourth predetermined temperature ($T_{2C}$) above the solidification point of the liquefied coating material as it passes through the second conduit.

According to the above mentioned embodiment, the controller may include:

a first control component in communication with the first and second heat sensors and the first and second heaters to control the first heater so that the temperature of the coating material held in the reservoir has a predetermined temperature ($T_R$) above the liquification point of the coating material and to control the second heater so that the coating material maintains a second predetermined temperature ($T_C$) above the solidification point of the liquefied coating material as it passes through the conduit; and, a second control component in communication with the third and fourth sensors and the third and fourth heaters to control the third heater so that the second coating material held in the second reservoir has a third predetermined temperature ($T_{2R}$) above the liquification point of the second coating material and to control the fourth heater so that the second coating maintains a fourth predetermined temperature ($T_{2C}$) above the solidification point of the liquefied second coating material as it passes through the second conduit.

In some embodiments, temperature $T_{2C}$ is different from temperature $T_C$.

In some embodiments, the rotary screen printing device further includes an additional heater of which the output heats the rotatable cylindrical screen. Said additional heater may be a radiant heater disposed within the internal volume of the rotatable cylindrical screen. Alternatively, the additional heater may be an induction heater disposed externally to the rotatable cylindrical screen. In a further alternative, the additional heater may include a thermal incubator which encloses the rotatable cylindrical screen.

In accordance with a further aspect of the present disclosure, there is provided a rotary screen printing process, including:

releasing a liquefied coating material at a pre-determined temperature ($T_R$) above the liquification point of the coating material into a conduit which provides fluid communication to an internal volume of a rotating cylindrical screen, wherein the released liquefied coating material passes along the conduit and is introduced into the internal volume of the rotating cylindrical screen; and, the introduced liquefied coating material first contacts an internal surface of the rotating cylindrical screen and is then brought into contact with a squeegee which acts to impel the liquefied coating material through an array of apertures provided in the rotating cylindrical screen, the squeegee being fixedly disposed in the internal volume of the cylindrical screen so that the squeegee does not rotate within the cylindrical screen as the cylindrical screen is rotating;

determining one of the temperature of the conduit, the temperature of the liquefied coating material passing through the conduit or the temperature of the liquefied coating material discharged from the conduit to the internal volume of the rotary cylindrical screen using a second heat sensor;

using a heater, heating the conduit so that the coating material maintains a second predetermined temperature ($T_C$) above the solidification point of the liquefied coating material as it passes through the conduit;

contacting a printable substrate with an external surface of the rotating cylindrical screen so that liquefied coating material impelled through the apertures is transferred to the substrate; and, solidifying the transferred coating material on the substrate.

In an embodiment, the process comprises the steps of introducing a coating material into a reservoir;

determining the temperature of the coating material in the reservoir using a first heat sensor coupled to the reservoir;

using a first heater, heating the coating material held in the reservoir to a predetermined temperature ($T_R$) above the liquification point of the coating material;

releasing the liquefied coating material from the reservoir into a conduit which provides fluid communication between the reservoir and an internal volume of a rotating cylindrical screen, wherein liquefied coating material released from the reservoir passes along the conduit and is introduced into the internal volume of the rotating cylindrical screen; and, the introduced liquefied coating material first contacts an internal surface of the rotating cylindrical screen and is then brought into contact with a squeegee which acts to impel the liquefied coating material through an array of apertures provided in the rotating cylindrical screen, the squeegee being fixedly disposed in the internal volume of the cylindrical screen so that the squeegee does not rotate within the cylindrical screen as the cylindrical screen is rotating;

determining one of the temperature of the conduit, the temperature of the liquefied coating material passing through the conduit or the temperature of the liquefied coating material discharged from the conduit to the internal volume of the rotary cylindrical screen using a second heat sensor;

using a second heater, heating the conduit so that the coating material maintains a second predetermined temperature ($T_C$) above the solidification point of the liquefied coating material as it passes through the conduit;

contacting a printable substrate with an external surface of the rotating cylindrical screen so that liquefied coating material impelled through the apertures is transferred to the substrate; and, solidifying the transferred coating material on the substrate.

In some embodiments of the printing process, the conduit heater or, alternatively, both the first heater and second heater are controlled so that the temperature ($T_A$) of the coating material impelled through the apertures ($T_A$) of the rotating cylindrical screen is less than 1° C. above the solidification point of the liquefied coating material.

In some embodiments of the printing process, the coating material is substantially free of solvent.

In some embodiments, the coating material is substantially free of solvent and includes at least one of a side-chain crystalline polymer and an alkane.

The present disclosure also provides a printed substrate obtained using the process defined hereinabove and in the appended claims. In some embodiments, the substrate has printed thereon a coating material comprising at least one of a side-chain crystalline polymer and an alkane.

DETAILED DESCRIPTION

The use of rotary screen printing for the application of molten coating materials, such as hot melt adhesives, has been reported in the art. It is however considered that existing rotary screen printing devices may not provide effective control of the temperature of molten coating materials through all constituent components of the devices. Changes in temperature as the molten coating material passes through those components can cause localized changes in the viscosity and melt flow rate (MFR) of the material.

Furthermore, any solidification of the coating material can cause blockages and pressure build up within the device. These problems impact the efficacy of rotary screen printing for molten materials. Notably, the requisite cleaning of the device components is resource intensive.

An inability to precisely control the temperature, viscosity and melt flow rate has heretofore inhibited the use of rotary screen printing devices for molten coating materials which should be applied to a substrate within a narrow temperature range. Such a narrow range may be a consequence of the thermal sensitivity of the substrate to which the coating material is to be applied. It may also be a consequence of the molten coating material comprising or consisting of one or more compounds which, at a temperature proximate to their melting point: exhibits a conformational change; decompose; degrade; or, become reactive due to the thermal activation of latent functional groups.

The present disclosure provides for effective temperature control—and concomitantly viscosity and melt flow rate control—of molten materials which are to be applied by a rotary screen printing apparatus.

DEFINITIONS

As used herein, the singular forms “a”, “an” and “the” include plural referents unless the context clearly dictates otherwise.

The terms “comprising”, “comprises” and “comprised of” as used herein are synonymous with “including”, “includes”, “containing” or “contains”, and are inclusive or open-ended and do not exclude additional, non-recited members, elements or method steps.

As used herein, the term “consisting of” excludes any element, ingredient, member or method step not specified.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

As used herein, the terms “about” or “approximately” apply to all numeric values, whether or not explicitly indicated.

Further, in accordance with standard understanding, a weight range represented as being “from 0 to x” specifically includes 0 wt. %: the ingredient defined by said range may be absent from the composition or may be present in the composition in an amount up to x wt. %.

The words “preferred”, “preferably”, “desirably”, “optionally” and “particularly” may be used herein to refer to embodiments of the disclosure that may afford particular benefits, under certain circumstances. However, the recitation of one or more preferable, preferred, desirable, optional or particular embodiments does not imply that other embodiments are not useful and is not intended to exclude those other embodiments from the scope of the disclosure.

The word “exemplary” is used herein to mean serving as an example, instance, or illustration. Any aspect or design described herein as “exemplary” is not necessarily to be construed as preferred or advantageous over other aspects or designs. Rather, use of the word exemplary is intended to present concepts in a concrete fashion.

As used throughout this application, the word “may” is used in a permissive sense—that is meaning to have the potential to—rather than in the mandatory sense.

The term “plurality” as used herein, is defined as two or more than two.

As used herein, room temperature is 23° C. plus or minus 2° C.

Spatially relative terms, such as “upper”, “lower”, “top”, “back”, “above”, “below”, “left”, “right” and the like are used herein to describe an element’s relationship to another element(s) as illustrated in the figures. Obviously all such spatially relative terms refer to the orientation shown in the figures only for ease of description and are not necessarily limiting given that an apparatus according to an embodiment of the disclosure can assume orientations different from those illustrated in the figures when in use.

In addition, terms such as "first", "second", and "third" are used herein for purposes of description and are not intended to indicate or imply relative importance or significance.

Unless the context dictates otherwise, terms such as "coupled", "attached" and "connected" which are used herein to define the mechanical relationship between elements of the disclosure, should be broadly interpreted. For example, elements may be fixedly connected, detachably connected or integrally connected; further, elements may be directly connected, or may be indirectly connected via an intermediate medium.

As used herein, the terms "applied on", "disposed on", "deposited on", "deposited over" or "overlaid" mean respectively applied, disposed, deposited and overlaid on but not necessarily in contact with the stated surface. For example, a coating composition "disposed on" a substrate does not preclude the presence of one or more other coating layers of the same or different material located between the formed coating layer and the substrate.

The term "coating material" as used herein refers to an element, substance or composition that can form a coating over at least a portion of a substrate.

The term "machine direction" (MD) is used herein to refer to the primary direction of the substrate flow through the rotary screen printing apparatus or device. The term "cross direction" (CD) is used herein to refer to that direction in the plane of the substrate that is generally perpendicular to the machine direction.

The term "cylindrical" as used herein means a three-dimensional object that is obtained by taking a circular two-dimensional area and projecting it in one direction so that the resulting three-dimensional object has the same cross-sectional size and circular shape at any location along its length.

Sensors are devices that respond to a stimulus and communicate information about that stimulus. The stimulus can be any physical phenomenon, non-limiting examples of which include heat, light, pressure, electric or magnetic fields, motion, and changes in any of these over time or space. Thus a "hear sensor" refers to a sensor which responds to the stimulus of heat and, optionally changes in heat over time and space. The term may refer herein to any suitable type of heat sensor, of which non-limiting examples include thermometers, bolometers, thermocouples, thermistors, resistance temperature detectors and infrared (IR) sensors. The term "heat sensing zone" shall be interpreted to mean a zone extending away from the heat sensor within which heat may be sensed by the sensor.

The terms "controller" or "control component" refer to dedicated hardware elements which are capable of executing software. The controller or control component may, for example, include as hardware elements one or more of: digital signal processor (DSP) hardware; a network processor; application specific integrated circuit (ASIC); field programmable gate array (FPGA); read only memory (ROM) for storing software; random access memory (RAM); non-volatile storage; or, logic.

The heaters and sensors of the present disclosure are in communication with either a controller or control component. The heater and sensors may be able to receive executable instructions from the controller or control component and execute those instructions; some examples of instructions are software, program code and firmware. The controller or control component may be included as part of the heater or the sensor or may be separate. Where physically separate, the controller may have a wired or wireless connection to the heater and/or sensor. Alternatively, a central computer controller or controllers for the entire printer may provide the control as well as other types of control needed for other printer subsystems.

As used herein, the term "valve" refers to a device to control the flow of a liquid, gas, or other material through a channel.

As used herein, the term "alloy" refers to a substance composed of two or more metals or of a metal and a non-metal which have been intimately united, usually by being fused together and dissolved in each other when molten.

As used herein "polymer" refers to a substance having a chemical structure that includes the multiple repetition of constitutional units formed from substances of comparatively low relative molecular mass relative to the molecular mass of the polymer. The term "polymer" includes soluble and/or fusible molecules having chains of repeat units, and also includes insoluble and infusible networks. As used herein, the term "polymer" can include oligomeric materials, which have only a few constitutional units, such as from 5 to 20 units.

As used herein "monomer" refers to a substance that can undergo a polymerization reaction to contribute constitutional units to the chemical structure of a polymer.

As used herein, "homopolymer" means that the polymer molecule is constituted by only one monomer and thus does not encompass copolymers comprising additional co-monomers.

As used herein, "copolymer" includes a polymer having at least two different monomeric units, and includes copolymers having two monomeric units, terpolymers having three monomeric units, tetrapolymers having four monomeric units, pentapolymers having five monomeric units et cetera. It will be appreciated that copolymers disclosed herein may be: random copolymers; block copolymers; alternating copolymers; or, a combination of two or more of these motifs.

The term "elastomer" refers to a polymer, polymer blend or polymer composition consistent with the definition of ASTM D1566. The term may be used interchangeably with the term "rubber."

The term "curing" as used herein refers to a change in state, condition and/or structure of a material that is induced by: at least one ambient condition, such as temperature, pressure, moisture and irradiation; and/or the presence of a curative and optionally a curing catalyst or accelerator. The term includes but is not limited to solidification, hardening or setting of a material. Further, the term is intended to encompass both partial as well as complete curing.

Crystallinity refers to the degree of structural order in a solid. Polymers that have ordered regions in the solid state, wherein their molecular chains are partial aligned, are described herein as "crystalline" polymers. Above their melting temperatures, such polymers are "crystallizable". The terms "crystalline" and "crystallizable" are used herein in relation to certain polymers with the understanding that the respective polymer can be "crystalline" below its melting temperature and "crystallizable" above.

Crystallinity is usually specified as a percentage of the volume of the material that is crystalline. That percentage may be determined by inter alia: density measurements; differential scanning calorimetry (DSC); X-ray diffraction (XRD); infrared (IR) spectroscopy; and, nuclear magnetic resonance (NMR). Where polymer crystallinity is determined by differential scanning calorimetry (DSC), the heat associated with melting (fusion) of the polymer is quantified: this heat is reported as percentage crystallinity by normalizing the observed heat of fusion to that of a 100% crystalline sample of the same polymer.

The qualification that a material is "crystalline" does not necessarily infer one hundred percent (100%) crystallinity, although one hundred percent crystallinity can be included: the term "crystalline" is intended to encompass the concept of "semicrystalline". For example, a "crystalline" or "crystallizable" polymer can be a polymer that includes one or more regions that are crystalline or crystallizable and has one or more other regions that are not crystalline or crystallizable.

The term "solidification point" as used herein denotes the temperature at which substantially all the liquid phase of a material solidifies or vitrifies. This temperature can be determined from a phase diagram or may be measured by differential scanning calorimetry (DSC).

The "liquification point" refers to the temperature at which a sufficient portion of a substantially solid material has formed a liquid fraction such that the material is capable of flow. In certain circumstance, the liquification point nay correspond to the melting point of the material.

As used herein, the term "melting temperature", or "melting point" refer to the temperature at which a material exhibits peak unit heat absorption per degree Celsius, as determined by Differential Scanning Calorimetry (DSC). Above its melting temperature, the transport material can exhibit liquid properties and can move, for example, flow or diffuse.

As used herein, the term "melt onset temperature" refers to the temperature at which the meltable material begins to exhibit an increase in unit heat absorption per degree Celsius, as determined by differential scanning calorimetry. Below its melt onset temperature, the material can be solid.

As used herein, the term "melting temperature range" refers to the temperature range from the melt onset temperature to the melting temperature of a material.

The term "polymethylene" as used herein references a polymer or a portion thereof which consists of methylene ($CH_2$) residues catenated or linked into chains.

As used herein, "(meth)acryl" is a shorthand term referring to "acryl" and/or "methacryl". Thus, the term "(meth) acrylate" refers collectively to acrylate and methacrylate.

As used herein "alkane" refers to chemical compounds that consist only of hydrogen and carbon atoms which are bonded exclusively by single bonds without any cycles.

As used herein, "$C_1$-$C_n$ alkyl" group refers to a monovalent group that contains 1 to n carbons atoms, that is a radical of an alkane and includes straight-chain and branched organic groups. As such, a "$C_1$-$C_{18}$alkyl" group refers to a monovalent group that contains from 1 to 18 carbons atoms, that is a radical of an alkane and includes straight-chain and branched organic groups. In general, a preference for alkyl groups containing from 1-12 carbon atoms ($C_1$-$C_{12}$ alkyl)—for example alkyl groups containing from 1 to 8 carbon atoms ($C_1$-$C_8$ alkyl)—should be noted. Examples of alkyl groups include, but are not limited to: methyl; ethyl; propyl; isopropyl; n-butyl; isobutyl; sec-butyl; tert-butyl; n-pentyl; n-hexyl; n-heptyl; and, 2-ethylhexyl. In the present disclosure, such alkyl groups may be unsubstituted or may be substituted with one or more halogen. Where applicable for a given moiety (R), a tolerance for one or more non-halogen substituents within an alkyl group will be noted in the specification.

As used herein, the term "solvent" refers to a homogenous liquid capable of solubilizing another substance. The term "solvent" encompasses both individual compounds and mixtures of compounds.

In the context of the present disclosure, the term "diluent" refers to a compound or mixture of compounds which lower the viscosity of the composition to which it is added. Based on their respective participation in chemical reactions within the composition to which they are added, diluents may be differentiated into reactive and non-reactive diluents.

As used herein, "Volatile Organic Compound" or "VOC" is any organic compound having a boiling point less than or equal to 250° C. as measured at standard atmospheric pressure of 101.3 kPa.

The molecular weights referred to in this specification can be measured with gel permeation chromatography (GPC) using polystyrene calibration standards, such as is done according to ASTM 3536.

As used herein, the term softening point (° C.) used in regard to waxes herein is the Ring & Ball softening point, which is measured unless otherwise indicated according to ASTM E28.

Viscosities of the materials described herein are, unless otherwise stipulated, measured using the Anton Paar Viscometer, Model MCR 301 at standard conditions of 25° C. and 50% Relative Humidity (RH).

The viscometer is calibrated one time a year and checked by services. The calibration is done with using special oils of known viscosity, which vary from 5,000 cps to 50,000 cps (parallel plate PP25 and at shear rate 1 $s^{-1}$ at 23° C.). Measurements of the compositions according to the present disclosure are done using the parallel plate PP20 at different shear rates from 1.5 to 100 $s^{-1}$.

The present materials may be defined herein as being "substantially free" of certain compounds, elements, ions or other like components. The term "substantially free" is intended to mean that the compound, element, ion or other like component is not deliberately added to the material and is present, at most, in only trace amounts which will have no (adverse) effect on the desired properties of the material. An exemplary trace amount is less than 1000 ppm by weight of the material. The term "substantially free" expressly encompasses those embodiments where the specified compound, element, ion, or other like component is completely absent from the material or is not present in any amount measurable by techniques generally used in the art.

BRIEF DESCRIPTION OF THE DRAWINGS

Embodiments of the present disclosure will be described with respect to the appended drawings in which.

DETAILED DESCRIPTION

Figure 1:
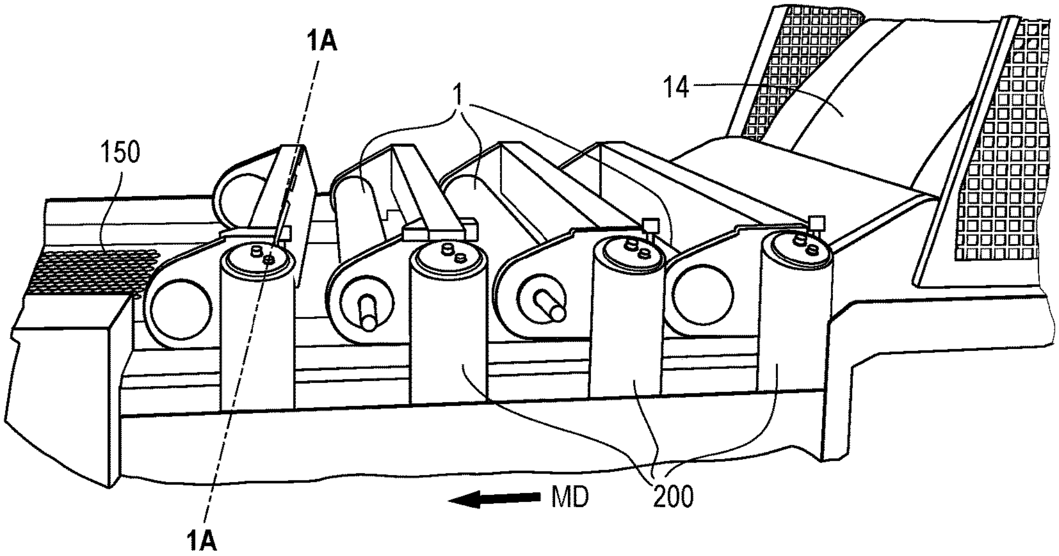
FIG. 1 is a perspective view of a rotary screen printing system comprising a plurality of rotary screen printing devices.

FIG. 1 illustrates a rotary screen printing system which comprises a plurality of rotary screen printing devices (1) arranged sequentially in a machine direction (MD). The rotary screen device of the present disclosure may be incorporated as one or more device within such a system. However, in some embodiments, the rotary screen printing device of the present disclosure may be a stand-alone device.

Figure 2A:
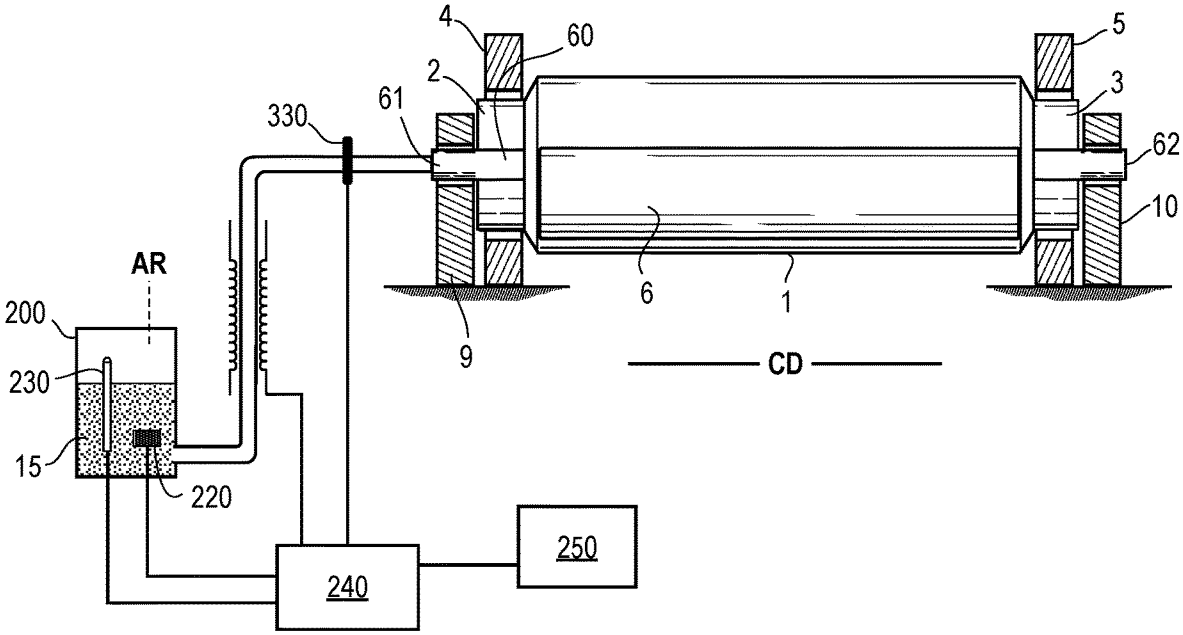
FIG. 2*a* is a sectional view of a rotary cylindrical screen taken along line 1A-1A from FIG. 1 in accordance with an embodiment of a rotary screen printing device of the present disclosure.

FIG. 2*a* is a sectional view taken along line 1A-1A of FIG. 1 and illustrates a rotary screen printing device in accordance with the present disclosure. More particularly, FIG. 2*a* illustrates a cylindrical screen (1) of the rotary screen printing device, which screen (1) is accommodated with ends (2, 3) respectively supported in a drive unit (4) and a support unit (5). The drive unit (4) is provided with a mechanism for rotatably driving the cylindrical screen (1). The support unit (5) may in some embodiments incorporate a suspension or dampening device to minimize non-rotational movement of the cylinder (1) as it rotates at angular velocity ($V^R$). A squeegee (6) extends across the cylindrical screen (1). The squeegee (6) is fixedly disposed within the internal volume of the cylinder (1) such that it does not rotate with the screen: the squeegee (6) is supported by a manifold (60) the ends of which (61, 62) are accommodated respectively in supports (9,10). A conduit (11) for the supply of the coating composition (15) from a reservoir (200) is connected to proximal end (61) of the manifold (60) which supports the squeegee (6).

In certain embodiments, one or more actuatable valves (not shown) may be disposed along the length of the conduit (11) to control the flow of the coating material (15) between the reservoir (200) and the manifold (61). Whilst that flow may gravitational in some embodiments, one or more pumps (not shown) may also be disposed along the length of the conduit (11).

Figure 2B:
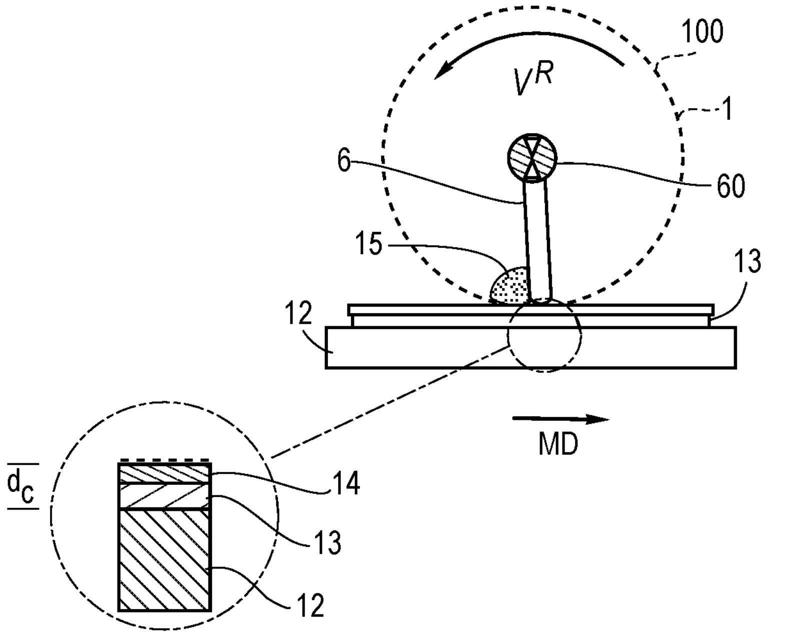
FIG. 2*b* is a sectional and exploded view of a rotary cylindrical screen taken along a line orthogonal to line 1A-1A from FIG. 1.

FIG. 2*b* provides a sectional view, parallel to the machine direction (MD) through a cylindrical screen (1) of a rotary screen printing device of FIG. 2*a*. An expanded view of the configuration of the substrate (14) to be printed is also provided therein.

As shown, the squeegee (6) is disposed within the cylindrical screen (1) by attachment to a manifold (60): the squeegee (6) and its associated manifold (60) both extend across the width of the cylindrical screen. The manifold (60) is disposed at or beneath the central axis of the rotary cylindrical screen (1) and is provided with at least one central cavity which receives the coating material (15) from the conduit (11) to which it is operatively connected. The manifold (60) is further provided with one or more openings (not shown) which extend through the manifold's external surface to the cavity thereof. The coating material (15) may pass through said openings and is thereby delivered to internal surface of the rotary cylindrical screen (1).

The illustrated shape of the squeegee (6) in FIG. 2*b* is not intended to be limiting: rather the squeegee may possess any operative shape that is capable of spreading the coating material (15) on the internal surface of the rotary cylindrical screen (1). The squeegee (6) will conventionally possess sufficient flexibility such that, when its leading edge is disposed to contact a moving surface, the squeegee traverses that surface. Exemplary materials from which the squeegee may be constructed include: alloys, such as spring steel or stainless steel; fluoropolymers such as a Teflon® polytetrafluoroethylene based composition; and, elastomers such as a silicone elastomers.

The squeegee (6) may be urged into contact with the internal surface of the rotary cylindrical screen (1) by a source of pressure (not shown), which source may, for example, be a mechanical, electromechanical, pneumatic or magnetic source. It is envisaged that the pressure exerted on the squeegee (6) may be adjusted based on inter alia the resiliency of the squeegee, the amount of coating material (15) to be applied and the printing definition which is required. Under the action of the squeegee (6), the coating material is extruded from rotary cylindrical screen at a temperature ($T_A$).

Figure 3:
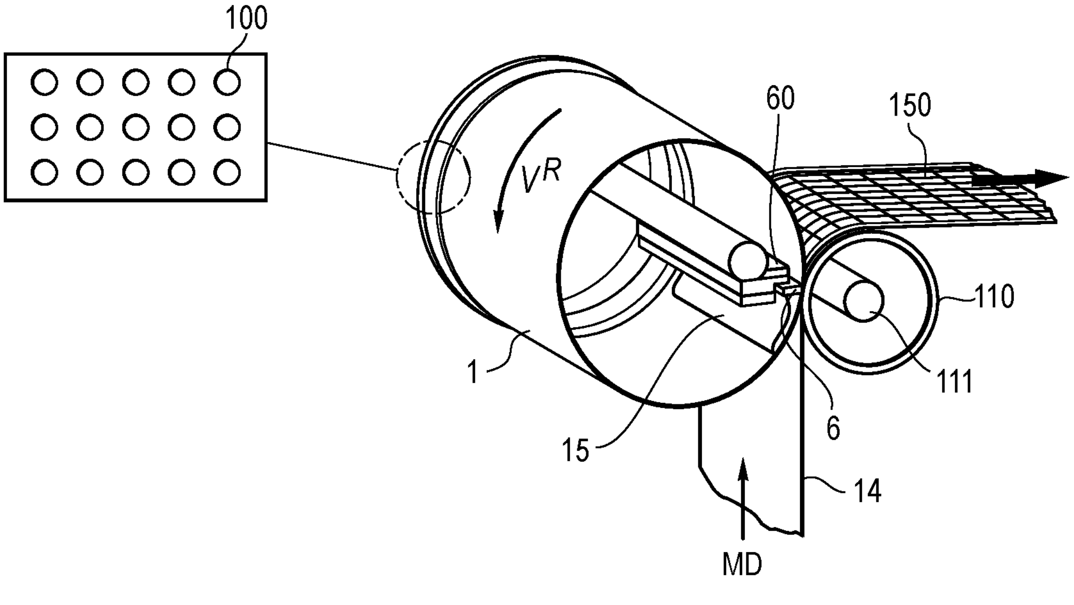
FIG. 3 is a sectional equivalent to that of FIG. 2*b* but of a rotary cylindrical screen in accordance with an alternative embodiment of the present disclosure.

The cylindrical screen (1) is provided with a multiplicity of apertures (100)—also shown in FIG. 3—which extend substantially across the cylindrical screen and which, in combination, are determinative of the pattern (150, FIGS. 1,3) of coating material which is applied to the substrate (14) using that specific screen (1). In a printing system comprising more than one such rotary cylindrical screen (1), such as that illustrated in FIG. 1, the configuration of the apertures (100) for each screen (1) will be adapted to achieve a particular final coating pattern (150) upon synchronization of the rotational speeds ($V^R$) of the screens, the relative positions of the rotary screens and the velocity of the substrate (14) in the machine direction (MD). That aside, there is no particular intention to limit the configuration of the apertures (100) in the rotary cylindrical screen (1) and thereby the coating pattern obtained. Moreover, in a printing system comprising a plurality of rotary screens, the configuration of the apertures (100) of each screen may be independently determined. However, in an interesting embodiment of that system, rotary screens disposed sequentially in the machine direction may be provided with the same configuration of apertures: this may enable the coating composition to be applied by each rotary screen to be deposited in the same pattern and, optionally, to be deposited in a laminar manner by each sequential rotary screen.

Independently of the configuration of the apertures (100), the rotary cylindrical screen (1) may in some embodiments be characterized by at least one of:

i) an effective open area of from 1 to 50%, for example from 5 to 50% or from 5 to 30%;
ii) an effective aperture area of from 0.1 to 15 $mm^2$, for example from 0.5 to 10 $mm^2$;
iii) an aperture aspect ratio, defined as the ratio of the major axis to the minor axis of a single aperture, of from 1 to 15, for example from 1 to 10 or from 1 to 5; and,
iv) an aperture density of at least 150, for example at least 300.

These characterizations are not mutually exclusive: one, two, three or four of these characterizations may be applied.

It will be appreciated that a variety of approaches may be employed to provide the substrate (14) to the rotary screen printing apparatus. For example, the provision of the substrate (14) may be: continuous, such as being provided from a roll stock or a stack; semi-continuous; on-demand; or, discontinuous, such as being provided in discrete units.

The provided substrate (14) moves in the machine direction (MD) at a speed such that it passes under the rotary cylindrical screen and receives an effective amount of the coating material (15) without substantial deviations. By deviation is meant any undesired attribute within the print including but not limited to variant thickness of the coating, line breaks, smudges and other ostensible departures from the pre-determined pattern (150, FIGS. 1,3). Illustrative speeds of the substrate in the machine direction (MD) are from 0.1 to 1 $ms^{-1}$, for example from 0.1 to 0.5 $ms^{-1}$.

The rotary cylindrical screen (1) of FIG. 2*b* is depicted as contacting the substrate (14) which is carried in the machine direction (MD) by a horizontal planar shuttle (12). A laminar support (13)—sometimes referred to in the art as a blanket or wafer—is interposed between the shuttle (12) and the substrate (14). It will be acknowledged that such a laminar support is optional. The gap ($d_c$) between the external surface of the rotary cylindrical screen (1) and the upper surface of the shuttle (12), and the surface tension and resiliency of the substrate (14), shuttle (12) and laminar support (13, if present) are each partially determinative of the pressure at the point of contact point of the rotary cylindrical screen (1) and the substrate (14) and thereby of the volume of the coating composition (15) transferred to the substrate (14).

Alternative configurations of shuttle (12) and rotary cylindrical screen (1) will be known to those of ordinary skill in art. The shuttle (12) may, for instance, convey the substrate between the rotary cylindrical screen and a counter roller: the movement of the shuttle (12) and the carried substrate need not be in the horizontal plane, as illustrated in for example U.S. Pat. No. 6,098,546A. FIG. 3 also provides such an alternative configuration wherein the substrate (14) is passed between the rotary cylindrical screen (1) and an impression roller (110). A plate cylinder drive (111) is disposed within the impression roller (110).

As described herein above, the rotary screen printing device may in some embodiments comprise at least one heater (not shown) of which the output heats the rotary screen cylinder (1). The form of this heater is not intended to be limited and may comprise or consist of: a heated gas stream provided to the internal volume of the rotary cylindrical screen (1); a radiant heater disposed within the internal volume of the rotary cylindrical screen; a radiant heater disposed external to the rotary cylindrical screen (1); an induction heater disposed external to the rotary cylindrical screen (1); and, an incubative heater which surrounds or encloses at least a portion of the rotary cylindrical screen (1). Exemplary heaters for generating heat energy for direct absorption by the cylindrical screen are described in: U.S. Pat. No. 4,693,179 (Watts et al.); WO85/03672 (Lockwood Technical, Inc.); US 2011/0079156 (Bartesaghi); Netherlands Patent No. 10 30 670 C (Stork Prints B. V. te Boxmeer); and, U.S. Pat. No. 5,772,763 B1 (Hines, Jr. et al.).

As depicted in FIGS. 1 and 2*a*, a reservoir (200) is provided for a coating material (15): a conduit (11) provides fluid communication between the rotary screen cylinder (1) and the reservoir (200). Whilst only one such reservoir is illustrated per screen (1), it will be appreciated that more than one reservoir (200) may actually be coupled to a given rotary cylindrical screen (1).

As used herein, the term "reservoir" includes a receptacle, chamber or similar vessel for containing a fluid coating composition for supply to the rotary printing device. The or each reservoir of the rotary printing device may be equipped with an agitator which herein refers to a mechanism that imparts motion to the contents of the reservoir. That motion may be sufficient to ensure that any solid components within a fluid coating composition are placed into or maintained in suspension prior to the supply of the coating material to the rotary printing device. The agitation may, in certain embodiments, be sufficient to ensure the fluid coating material is homogeneous. As in known in the art, agitation may be provided continuously, periodically or as a single action: the energy and, if applicable, the frequency of agitation may be moderated for a given coating material disposed in the or each reservoir (200).

In an exemplary embodiment, the agitator comprises at least one paddle element which is configured to rotate about an axis parallel to the longitudinal (vertical) axis ($A_R$) of the reservoir and which is configured to extend out of a primary plane of the agitator. In this configuration, the rotation of the or each paddle element will generally provide circumferential and/or radial mixing of the coating material in a substantially horizontal direction. The efficacy of mixing throughout the fluid contained in the reservoir may be improved by providing a plurality of said paddle elements disposed vertically in a direction generally parallel to the rotational axis of the agitator. The cross-sectional profile of the or each paddle element may vary: for each paddle element, the cross-sectional profile may, for example, be independently selected from the group consisting of: elliptical; annular; and, quadrilateral.

Referring again to FIG. 2*a*, the rotary screen printing device comprises a reservoir (200) to hold a coating material (15) and a first heater (220) is provided which heats and liquefies the coating material (15) held therein. A first sensor (230) is coupled to the reservoir (200). A conduit (11) provides fluid communication of the coating material (15) between the reservoir (200) and the internal volume of the rotatable cylindrical screen (1) having, as described above, an internal volume and an array of apertures there through. A squeegee (6) is fixedly disposed in the internal volume of the cylindrical screen so that the squeegee does not rotate within the cylindrical screen when the cylindrical screen is rotated. The apparatus is further provided with a second heater (320) to heat the conduit (11) and a second heat sensor (330) to detect one of the temperature of the conduit (11), the temperature of the liquefied coating material (15) passing through the conduit (11) or the temperature of the liquefied coating material (15) discharged from the conduit to the internal volume of the rotary cylindrical screen (1). It will be appreciated that the form and positions of the first heater (220), first sensor (230), second heater (320) and second sensor (330) shown in FIG. 2*a* are illustrative only.

A controller (240), optionally connected to a power source (250), is in communication with the first sensor (230) and second sensor (330) and the first heater (220) and second heater (320). Via the controller, the energy provided by the heaters (220, 320) may thus be controlled to attain or maintain specific temperature conditions of the liquefied coating material held in the reservoir (200) or passing through the conduit (11). In particular, the controller (240), receiving data from the first sensor (230), instructs the first heater (220) to expend sufficient energy so that the temperature of the coating material (15) held in the reservoir has a predetermined temperature ($T_R$) above the liquification point of the coating material. Further, the controller (240), receiving data from the second sensor (330), instructs the second heater (320) to expend sufficient energy so that the coating material (15) maintains a second predetermined temperature ($T_C$) above the solidification point of the liquefied coating material as it passes through the conduit (11). For example, the coating material (15) may be held in the reservoir (15) at a pre-determined temperature ($T_R$) which is from 0.1 to 5° C., from 0.1 to 2° C. or from 0.1 to 1° C. above the liquification point of the coating material (15). The temperature ($T_C$) of the coating material within the conduit (11) may, for example, be from 0.1 to 2° C., from 0.1 to 1° C. or from 0.1 to 0.5° C. above the solidification point of the coating material.

The heat sensors (230, 330) may be disposed within the coating material (15) respectively held within the reservoir (200) or passing through the conduit (11). Exemplary sensors for this embodiment may include thermometers, such as dip stick thermometers. Alternatively, the heat sensors (230, 330) may be disposed upon an inner surface of, respectively, the reservoir (200) or the conduit (11) at a location such that liquefied coating material (15) is within the heat sensing zone of the respective sensors. For example, an infrared sensor may be disposed on an internal surface of the reservoir (200) facing but not being immersed in the coating material (15). It is further considered that the heat sensors (230, 330) may, in some embodiments, be disposed on an external surface of, respectively, the reservoir (200) and the conduit (11): this election may be made where, for example, the reservoir and/or conduits possess sufficient conductivity to permit the utility of thermocouples or thermistors.

The form of the first heater (220) is not intended to be limited. As such, it is envisaged that the first heater (220) may be one or more of: an incubative heater; a radiative heater directed at the reservoir contents; an immersed heater; or, an inductive heater. Exemplary embodiments of the first heater (220) are illustrated in FIGS. 4*a* and 4*b*.

Figure 4A:
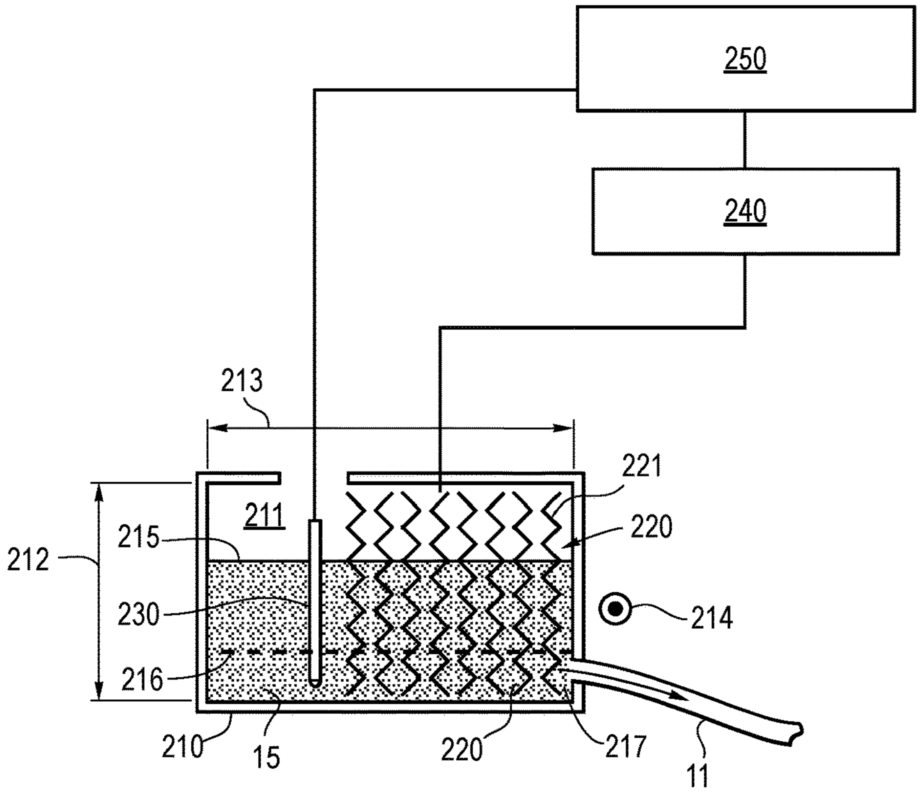
FIG. 4*a* illustrates a first embodiment of a reservoir of a rotary screen printing device in accordance with an embodiment of the present disclosure.
Figure 4B:
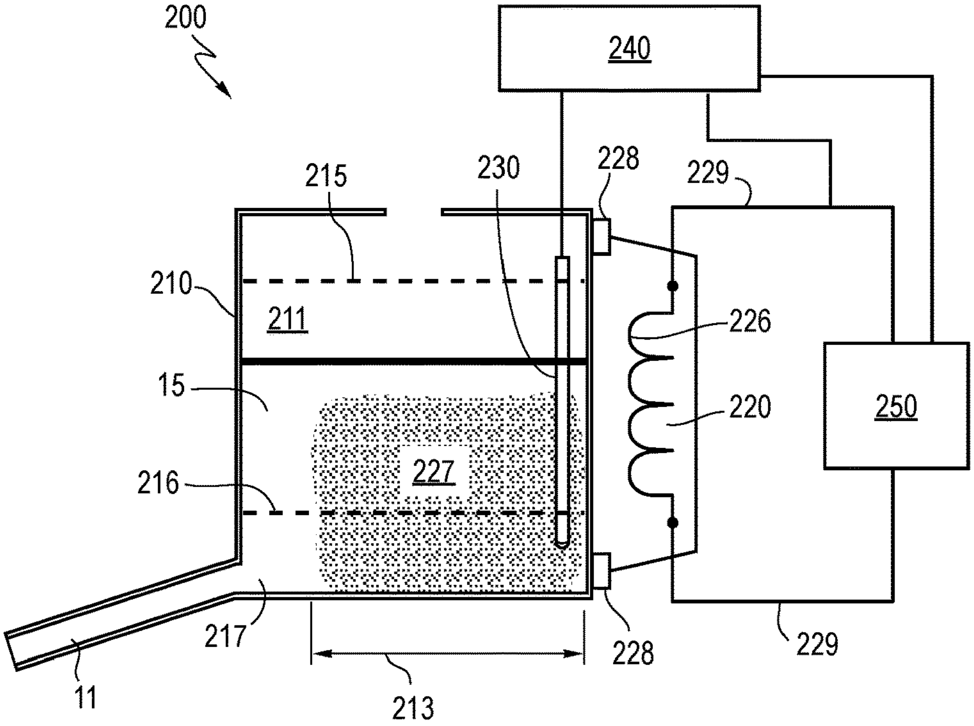
FIG. 4*b* illustrates a second embodiment of a reservoir of a rotary screen printing device in accordance with an embodiment of the present disclosure.

FIGS. 4*a* and 4*b* both depict a reservoir (200) including a housing (210) composed of a thermally insulating material which is configured to provide at least some heat retention within the reservoir volume (211). The reservoir volume (211) has an internal height (212), width (213) and depth (214, extending through the page). The upper liquid level (215) for the volume of the coating material (15) within the reservoir may be well below the upper reservoir confinement as this will enable a portion of the reservoir volume (211) to remain unfilled during the printer operation: this configuration may, for example, enable the coating composition (15) to be retained when the reservoir is tipped at an angle. The reservoir (200) is depicted as being partially open at the top but may, of course, be closed or otherwise vented.

In the illustrated embodiment of FIG. 4*a*, the reservoir volume (211) encloses a heater element (220) which is connected to an electrical power source (250). A controller (240) is operatively connected to the electrical power source (250) and to a sensor (230). The depicted heater element (220) includes multiple vane-like heating members (221), that extend substantially across the width (213) of the reservoir volume (211). The shape of heater element (221) is intended to provide a surface area exposed to the coating material (15) that is greater than the surface area defined by the height (212) and width (213) of the reservoir volume (211).

The heater (220) depicted in FIG. 4*a* occupies a position in reservoir volume (211) that is proximate to the conduit (11) which provides fluid communication of the coating material (15) between the outlet (217) of the reservoir and the internal volume of the rotatable cylindrical screen (not shown). This configuration is intended to concentrate the heating of the coating material near the conduit (11).

The heater (220) may extend from the bottom of reservoir volume (211) towards the top of reservoir volume (211). The parametric volume of heater element (220) may be greater than 50% of the total volume of reservoir volume (211) up to the upper liquid volume level (215). Heater element (220) extends below a low limit fluid level, shown by dashed line (216). As used herein, the term "low limit fluid level" refers to a minimum level of a fluid held in the reservoir during operation. As the fluid level in a reservoir reaches the lower limit fluid level, the printing device or printing system may issue an alarm or status message, or suspend operation or take other actions to ensure that the fluid level in reservoir volume (211) is maintained above the low limit fluid level.

The heater (220) is capable of generating and maintaining heat levels suitable for maintaining the coating composition (15) in the reservoir at a pre-determined temperature ($T_R$). The heater element (220) of FIG. 4*a* may, in certain embodiments, be formed from a positive thermal coefficient (PTC) which exhibits an increased resistance to a flow of electrical current in response to an increase in temperature of the material. The PTC material, which may be a ceramic like substance, may be formed into a heater and coated, as appropriate or required, for chemical compatibility with the coating material being heated.

The illustrative embodiment of FIG. 4*b* depicts a first heater (220) for a reservoir (200) based on an inductive heating system. The system comprises an induction power supply (250), an induction coil (226) and an inductive heater element (227). The induction coil (226) is disposed exterior to the reservoir housing (211), the placement thereof being facilitated by connectors (228).

The term "coil" as used in this context defines a number of turns or fractions of turns of a conductive material having a elongate shape, such as a wire, ribbon or trace. It will be appreciated that the induction coil (226) may possess a number of turns distinct from that illustrated in FIG. 4*b* and further that the induction coil (226) may have a variety of different cross-sectional geometries: for instance, the cross-section of the induction coil (226) may be flat, rectangular, circular or semi-circular. Aside from the illustrated shape of the induction coil (226) in FIG. 4*b*, it will be appreciated that the coil (226) may be of another physical form such as a helical coil, solenoidal coil, spiral coil, Helmholtz coil or birdcage coil.

Electric leads (229) couple the induction coil (226) to the power supply (250) which, in operation, generates an alternating current that passes through the induction coil (226). The alternating current causes the coil (226) to produce an alternating magnetic field that impinges on the inductive heater element (227) in the reservoir volume (211). As is known in the art, the alternating magnetic field induces heat in the inductive heater element (250) through eddy current losses and/or hysteresis.

Controller (240) is coupled to a sensor (230)—here depicted as being at least partially disposed in the liquefied coating material (15)—and to the induction power supply (250) in order to activate the power supply (250) to generate the alternating current at an amplitude and/or a frequency to control the amount of heat generated in the heater element (227). By controlling the amplitude and frequency of the power supply (250)—and optionally by varying the positioning of the induction coil (226) with respect to the heater element (227)—a targeted level of heat may be rapidly generated in the heater element (227).

The heating element (227) is formed at least partially of a thermally conductive material capable of generating and maintaining heat levels suitable for maintaining the coating composition (15) in the reservoir at a pre-determined temperature ($T_R$) in response to the magnetic fields from the induction coil (226). In one embodiment, the heating element (227) is formed at least partially of a metallic material, although any suitable thermally conductive material may be used. The heating element (227) may have ferromagnetic properties that facilitate hysteresis heating of the heating element (227) in response to the alternating magnetic field.

A number of different shapes and configurations may be used for the heating element (227) but it is advantageous for the shape or configuration to provide a high surface area relative to the parametric volume of the heating element (227). For example, the heating element (227) may comprise a cluster, web, bundle, mesh, screen, braid or weave of conductive fibers, strands, or filaments. Such a grouping of thin conductive material offers a high surface area to volume ratio while providing space between the fibers and/or filaments to allow the liquefied coating composition (15) to flow through the outlet (217) of the reservoir (200).

The heating element (227) of FIG. 4*b* is arranged in the reservoir volume (211) proximate to the bottom of the reservoir volume and extending towards the top thereof. In one embodiment, the parametric volume of the heater element (227) is greater than 50% of the total volume of the reservoir volume (211) up to the upper volume limit (215). As depicted in FIG. 4*b*, at least a portion of the heater element (227) is arranged below the lower volume limit (216) of the reservoir volume (211) to enable at least a portion of the heater element (227) to be immersed in the coating material (15) during most operating modes and device states.

It will be appreciated that the second heater (320)—as depicted in FIG. 2*a* and of which the output is directed to the conduit (11)—may have a variety of forms. In some embodiments, the heater may comprise or consist of a thermal jacket which is disposed on at least a portion of the conduit, which thermal jacket is provided with a flow of heated fluid there through. The thermal jacket may be removable from the conduit in some embodiments. Based on the data from the heat sensor coupled to the conduit, a controller operatively connected to such a heater may be used to moderate at least one of: the temperature of the heated fluid; the flow rate of the heated fluid; and, the degree of agitation applied to heated fluid of the thermal jacket. The degree of agitation of the heated fluid may be determinative of the homogeneity of the fluid within the jacket and therefore the consistency of its transfer of thermal energy to the conduit (11). Exemplary thermal jackets having utility in the present printing device include: baffled thermal jackets; unbaffled thermal jackets; dimple vessel thermal jackets; and, half-pipe coil vessel thermal jackets.

The temperature ($T_C$) of the coating material in the conduit (11) may in some embodiments be controlled by an impedance heater. The actuation of such a heater applies a low voltage alternating current (AC) potential across a length of the conduit (11): heat is generated by resistance to the flow of electric current through the wall of the conduit (11). The appropriate current (I) and voltage (V) which may generate a particular amount of heat in a given conduit (11) material characterized by a resistance (R) may be determined: preliminary tests may be conducted if required. An impedance heater—provided as the second or conduit heater (320)—should be provided with dielectric isolation from earth ground. Further, it may be advisable to electrically insulate the conduit (11) to minimize thermal losses. The electrical power source of this impedance heater is electrically connected to a controller (240) which is in further communication with the heat sensor (330) coupled to the conduit (11).

Impedance heaters are conventionally configured in one of two arrangements: end-feed and center-tap. Either of these arrangements may have utility in the present disclosure. In an end-feed impedance heater, the low voltage potential is applied across the entire length of the conduit (11). In a center-tap impedance heater, equally balanced alternating current (AC) flows from a mid-point connection on the conduit (11) to each end thereof.

The second heater (320) may in some embodiments comprises or consists of heat trace cables which are electrically connected to a power source and are either disposed along the length of the conduit (11) or wrapped around the conduits (11) at pre-determined intervals. The power source is necessarily connected to a controller which is in further communication with the heat sensor coupled to the conduit. Illustrative heaters comprising heat trace cables ate disclosed in: U.S. Pat. No. 5,294,780 (Montierth et al.); U.S. Pat. No. 5,086,836 (Barth et al.); U.S. Pat. No. 4,791,277 (Montierth et al.); U.S. Pat. No. 4,152,577 (Leavines); U.S. Pat. No. 4,123,837 (Homer); and, U.S. Pat. No. 3,971,416 (Johnson).

In some embodiments, the second heater (320) may comprise or consist of: an outer cylinder of greater diameter than the conduit (11) and which encloses at least a portion of that conduit (11) to create an annular volume; a resistive heating material having a positive temperature coefficient (PTC) disposed within that annular volume; and, an electrical power source configured to supply a voltage between at least two of the outer cylinder, the conduit (11) and the resistive heating material so as to increase the temperature of that resistive heating material. In some embodiments, the resistive heating material may comprise or consist of a conductive polymer composite comprising a dielectric polymer and an electrically conductive filler. The electrical power source of this second heater (320) is electrically connected to a controller (240) which is in further communication with the heat sensor (330) coupled to the conduit (11).

Figure 5A:
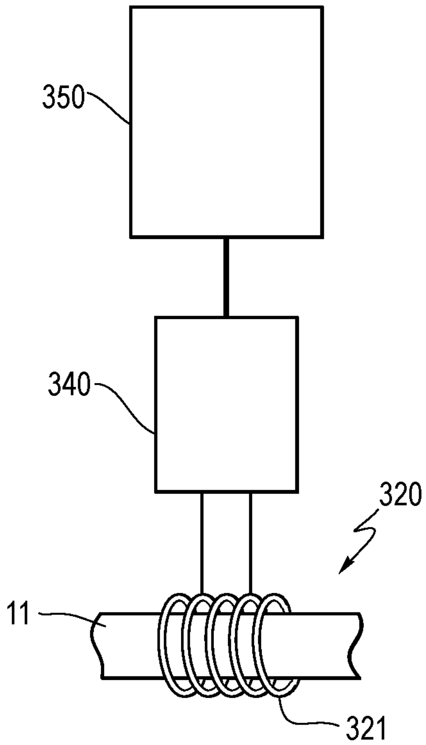
FIG. 5*a* is a first view of an embodiment of a conduit a rotary screen printing device in accordance with an embodiment of the present disclosure.
Figure 5B:
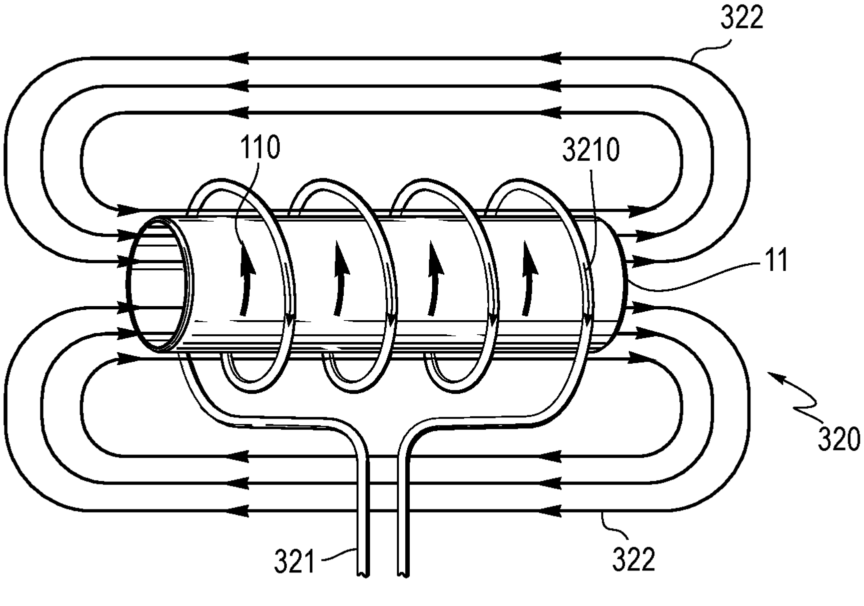
FIG. 5*b* is a second view of an embodiment of a conduit of a rotary screen printing device in accordance with an embodiment of the present disclosure.

FIGS. 5*a* and 5*b* depict an exemplary embodiment of the second heater (320), the output of which heater is directed to the conduit (11). The second heater (320) comprises a power source (350) which provides an alternating current (AC) to transmission coil (321) which is disposed around the conduit (11). A controller (340) is provided which can moderate at least the frequency and amplitude of the alternative current provided to the transmission coil. The term "coil" as used in this context again defines a number of turns or fractions of turns of a conductive material having a elongate shape, such as a wire, ribbon or trace. It will be appreciated that the transmission coil (321) may possess a variety of different cross-sectional geometries: for instance, the cross-section of the transmission coil (321) may be flat, rectangular, circular or semi-circular. Whilst the illustrated transmission coil (321) of the heater (320) has a helical shape, it is envisaged that other physical forms—such solenoidal coils, spiral coils, Helmholtz coils and birdcage coils—may have utility in this embodiment.

The illustrated conduit or second heater (320) may use inductive coupling whereby the alternative current (AC, 3210) running in transmission coil (321) induces a current (110) in the conduit (11) which is disposed within a shared electromagnetic field (322). The induced or eddy current (110) in the conduit (11) generates heat due to core loses: where an eddy current of magnitude I flows through the conduit (1H) providing a core path of resistance (R), energy will be dissipate energy in the form of heat according to the power (P) equation, $P=I^2R$.

The number of turns depicted in the transmission coil (321) of FIGS. 5*a* and 5*b* is purely illustrative. There is no particular intention to limit the number of turns of the transmission coil (321). However, increasing the number of turns may increase the efficiency of the coils, decrease the required inductor current and make it possible to more accurately control the heat pattern produced by the coils. As the heated length of the conduit (11) increases, the number of turns of the transmission coil (321) should generally increase in proportion.

To enhance energy transfer, the transmission coil (321) and the external surface of conduit (11) should be coupled as closely as possible without contacting one another. The magnetic flux generated by the transmission coil (321) is most concentrated closer to the turns of that coil and decreases with distance therefrom: the conduit (11) may therefore intersect more magnetic flux lines when disposed closer to the transmission coil (321).

The controller (340) of the second heater is in communication with a heat sensor (not shown) coupled to the conduit. As such, the controller (340) can moderate the energetic output of the conduit heater (320) to moderate the relative temperature of the coating material (15) passing through the conduit (11). In particular, the controller (340) moderates the heater (320) output such that the coating material (15) maintains a pre-determined temperature ($T_C$) above the solidification point of the liquefied coating material as it passes through the conduit (11). In some embodiments, the temperature ($T_C$) of the coating material within the conduit (11) is less than the temperature of the coating material (15) held in the reservoir (200). In other embodiments, the temperature ($T_C$) of the coating material within the conduit (11) is from 0.1 to 2° C., from 0.1 to 1° C. or from 0.1 to 0.5° C. above the solidification point of the coating material.

In certain embodiments where a coating material is an eutectic mixture, the temperature ($T_C$) of the coating material is above the solidification point of the liquefied coating material as it passes through the conduit (11) but is lower than the liquification point of the coating material held in the reservoir (200).

Figure 6:
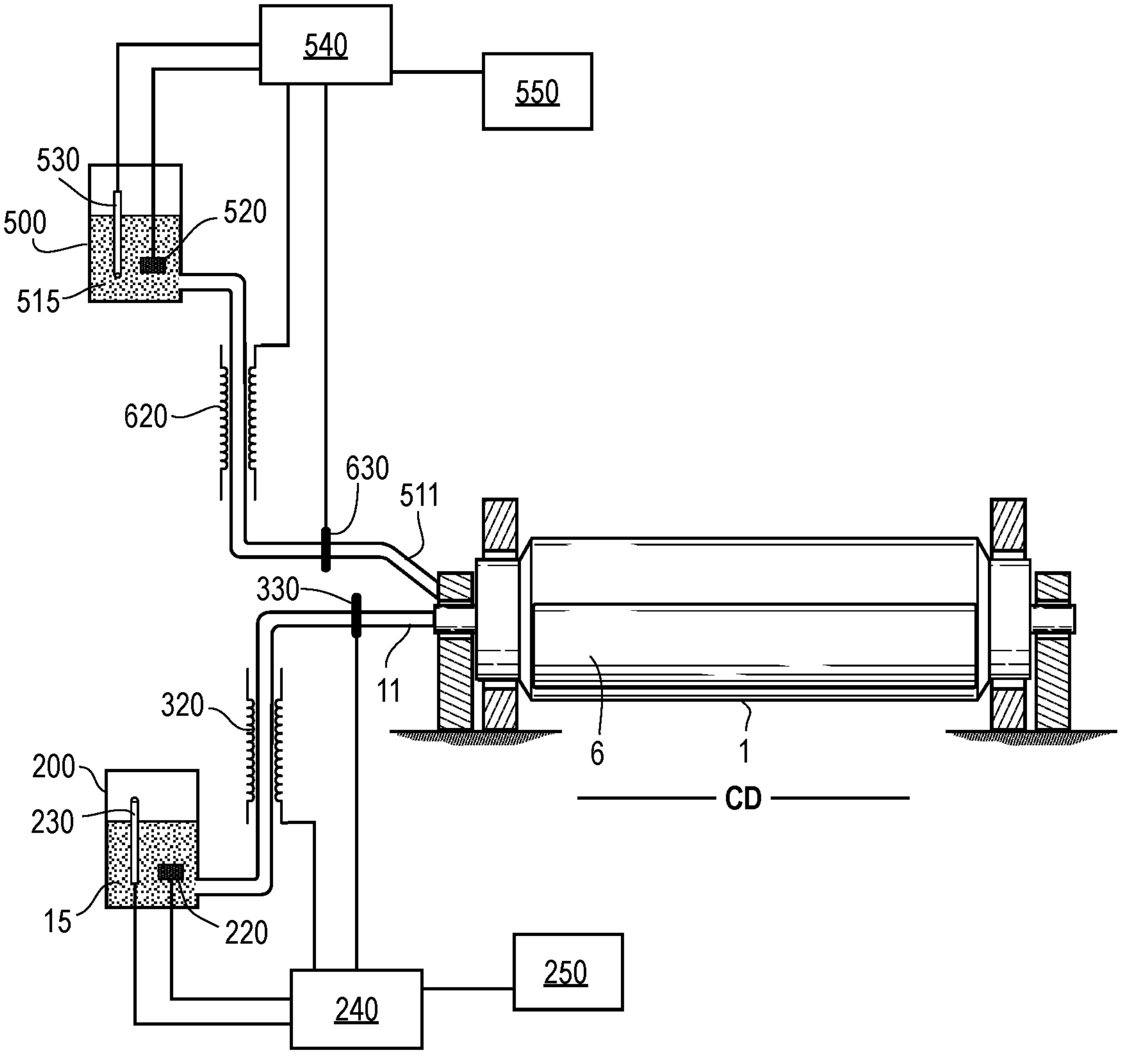
FIG. 6 is a sectional view of a rotary cylindrical screen in accordance with a further embodiment of the present disclosure.

In the embodiment illustrated in FIG. 6, the rotary screen printing device includes a first reservoir (200) to hold a first coating material (15) and a first heater (220) to heat and liquefy the coating material held in the reservoir. A first heat sensor (230) is coupled to the first reservoir (200). A first conduit (11) provides fluid communication of the first coating material (15) between the first reservoir (200) and the internal volume of the rotatable cylindrical screen (1). A second heater (320) is provided which heats the first conduit (11): a second heat sensor (330) is employed to detect one of the temperature of the conduit (11), the temperature of the liquefied first coating material (15) passing through the conduit (11) or the temperature of the liquefied first coating material (15) discharged from the conduit (11) to the internal volume of the rotary cylindrical screen.

A first control component (240) is in communication with the first and second heat sensors (230, 330) and the first and second heaters (220, 360) to control the first heater (220) so that the temperature of the first coating material (15) held in the reservoir (200) has a predetermined temperature ($T_R$) above the liquification point of the first coating material and to control the second heater (320) so that the first coating material maintains a second predetermined temperature ($T_C$) above the solidification point of the liquefied first coating material (15) as it passes through the conduit (11).

The device of FIG. 6 is further provided with a second reservoir (500) to hold a second coating material (515) and a third heater (520) to heat and liquefy the second coating material (515) held in the second reservoir (500). A third heat sensor (530) is coupled to the second reservoir (500). A second conduit (511) provides fluid communication of the liquefied second coating material (515) between the second reservoir (500) and the internal volume of the rotary cylindrical screen (1). A fourth heater (620) is provided which heats the second conduit (511): a second heat sensor (630) is employed to detect one of the temperature of the conduit (511), the temperature of the liquefied second coating material (515) passing through the conduit (511) or the temperature of the liquefied second coating material (515) discharged from the conduit (511) to the internal volume of the rotary cylindrical screen.

A second control component (540) is in communication with the third and fourth sensors (530, 630) and the third and fourth heaters (520, 620) to control the third heater (520) so that the second coating material (515) held in the second reservoir (500) has a third predetermined temperature ($T_{2R}$) above the liquification point of the second coating material and to control the fourth heater (620) so that the second coating maintains a fourth predetermined temperature ($T_2c$) above the solidification point of the liquefied second coating material as it passes through the second conduit.

The first control component (240) and the second control component (540) are depicted in FIG. 6 as being separate. It is however considered that each control component (440, 540) may be disposed within a singular controller.

The first reservoir (200) and the second reservoir (500) are in some embodiments not fluidly coupled. Further, in some embodiments, there are no fluid couplings at either the first reservoir (200), second reservoir (500), first conduit (11) and second conduit (511): the first (15) and second (515) molten materials disposed in the reservoirs are then fluidly isolated from one another except within the rotary cylindrical screen (1).

The heaters (220, 520) used for the first and second reservoirs (200, 500) may be the same or different and may be independently selected from the alternatives provided herein. Equally, the heaters (320, 620) used for the first and second conduits (11, 511) may be the same or different and may be independently selected from the alternatives provided herein.

Methods and Applications

The coating material of the present disclosure will typically comprise at least one film-forming resin that can form a self-supporting continuous film on a horizontal surface of a substrate upon curing and/or upon removal of any solvents, diluents or carriers present in the coating material. Broadly, it is envisaged that the at least one film-forming resin may be a thermosetting resin, a thermoplastic resin or a blend thereof.

The coating material may in certain embodiments be substantially free of solvent. In other embodiments, the coating material may be substantially free of solvent and comprise: at least one alkane; and/or, at least one side-chain crystalline polymer. In some of these embodiments, it is considered that the coating material may comprise two or more alkanes and/or two or more side-chain crystalline polymers.

Where one or more alkane is included in the coating material, it is preferred that the or each alkane meets the general formula $C_kH_{2k+2}$, wherein k is an integer of from 13 to 80, for example an integer of from 16 to 60 or from 18 to 60. Exemplary alkanes, which may be present alone or in combination in the coating material include: heptadecane; octadecane; nonadecane; icosane ($C_{20}$); dotriacontane ($C_{32}$); and, tetratetracontane ($C_{44}$).

Side-chain crystalline (SCC) polymers are polymers having crystalline regions or crystallites in the side chains of the polymer molecule. The crystallizable side chains of SCC polymers are typically selected to crystallize with one another to form the crystalline regions and are preferably linear to facilitate that crystallization. The side-chain crystalline polymers may or may not possess crystallinity in the backbone of the polymer molecule.

The spacing between side chains and the length and type of side chain are selected to provide the resulting SCC polymer with a desired melting point, which is generally precise and tightly controlled by the particular chemistry. As the spacing between side chains increases, the tendency for the side chains to be crystallizable tends to decrease. Further, as the flexibility of the side chains increases, the tendency for the side chains to be crystallizable tends to decrease. Conversely, as the length of the side chains increases, the tendency for the side chains to be crystallizable tends to increase. In many cases, the length of the crystallizable side chain may be in the range of from two to ten times the average distance between crystallizable side chains of the SCC polymer.

Many synthetic polymers having side chain crystallinity are known, from which suitable polymers having characteristics such as melting temperature, melting temperature range, molecular weight and viscosity useful for the purposes of the disclosure can be selected. Other side-chain crystallizable polymers that can be employed in the practice of the disclosure will be known or apparent to a person of ordinary skill in the art, in light of this disclosure, or will become known or apparent in the future, as the art develops, or can be prepared by a person of ordinary skill in the art. The or each side-chain crystalline polymer present in the coating material may be, independently, a homopolymer or a copolymer.

Importantly, side-chain crystallinity in a polymer can provide a relatively sharp transition from the solid state to the liquid state: side-chain crystalline polymers having melting temperature ranges of less than 10° C., less than 5° C., less than 2° C. or even less than 1° C. may be provided in embodiments of the coating material. Such a sharp state transition can provide for the utility of side-chain crystalline polymers—deposited from the coating material—in temperature monitoring devices applied to host products. The temperature response of the polymer can be correlated with those of a host product to facilitate monitoring the temperature exposure of that host product.

The or each side-chain crystalline polymer included in the coating material may in some embodiments be characterized by at least one of: i) a number average molecular weight (Mn) of from 10000 to 1500000 daltons, for example from 20000 to 1000000 daltons; and, ii) a heat of fusion of at least 20 J/g, for example at least 40 J/g.

In some embodiments, the side-chain crystallizable (SCC) polymer of the coating material may comprise or consist of at least one polymer or copolymer of (meth)acrylates having linear aliphatic side chains. Mention may be made in this regard of side chains comprising or consisting of polymethylene ($-(CH_2)_n-$) or polyoxyalkylene ($-((CH_2)_m-O-)_n$ groups, wherein: m is an integer of from 1 to 8; and, n is an integer of from 6 to 30, for example from 10 to 30. And exemplary polymers include homopolymers and copolymers of $C_6$-$C_{30}$ alkyl (meth)acrylates such as, but not limited to: poly(dodecylacrylate); poly(dodecylmethacrylate); poly(tetradecylacrylate); poly(tetradecylmethacrylate); poly(hexadecylacrylate); poly(hexadecylmethacrylate); polyoctadecylacrylate; poly(octadecylmethacrylate); poly(hexyl-co-decylacrylate); poly(hexyl-co-dodecylacrylate); poly(tetradecyl-co-octadecylacrylate); poly(hexadecyl-co-octadecylmethacrylate); and, poly(tetradecyl-co-hexadecylacrylate).

In other embodiments, the side-chain crystallizable (SCC) polymer of the coating material may comprise or consist of at least one polymer have chains of interconnected monomer units of formula (X):

(X)

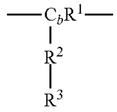

wherein:

$C_b$ is a backbone carbon atom;

$R^1$ is hydrogen or a $C_1$-$C_6$ hydrocarbyl group;

$R^2$ is an optional spacer unit; and, $R^3$ is a crystallizable group.

$R^2$ and $R^3$ together make up the side chain of the monomer unit. Further, $R^3$ may be crystallizable in itself or contain a crystallizable region.

It is preferred that:

$R^1$ is hydrogen or a $C_1$-$C_6$ hydrocarbyl group;

$R^2$ is a covalent bond or is selected from the group consisting of —O—, —$CH_2$—, —C(O)—, —OC(O)— and $NR_4$, wherein $R^4$ is hydrogen or $C_1$-$C_6$ alkyl; and, $R^3$ is selected from the group consisting of: $C_4$-$C_{30}$ alkyl; $C_6$-$C_{30}$ aryl; $C_4$-$C_{30}$ alkyl(meth)acrylate; and, $C_4$-$C_{30}$ alkyl(meth)acrylamide.

For surety, the SCC polymer containing said interconnected monomer units (X) may be homo-polymeric or copolymeric. In the latter alternative, the co-polymer may comprise more than different monomer conforming to formula (X), wherein the co-monomers may differ in one or more of substituents $R^1$ to R. Alternatively, or additionally, the co-polymer may further comprise a co-monomer (Y) which does not conform to formula (X).

Side-chain crystallizable polymers useful in the practice of the disclosure also described in: U.S. Pat. No. 5,156,911 at column 5, lines 67 to column 7, line 13, and, U.S. Pat. No. 9,546,911 at column 34, line 30 to column 41, line 19; O'Leary et al. "*Copolymers of poly*(*n-alkyl acrylates*): *synthesis, characterization, and monomer reactivity ratios*" in Polymer 2004 45 pp 6575-6585; and, Greenberg et al. "*Side Chain Crystallization of n-Alkyl Polymethacrylates and Polyacrylates*" J. Am. Chem. Soc., 1954, 76 (24), pp 6280-6285 ("Greenberg et al." herein.). Some useful side-chain crystallizable polymers, and monomers for preparing side-chain crystallizable polymers, are also available from commercial suppliers, for example: Scientific Polymer Products, Inc., Ontario, N.Y.; Sigma-Aldrich, Saint Louis, Mo.; TCI America, Portland Oregon; Monomer-Polymer & Dajac Labs, Inc., Trevose, Pa.; San Esters Corp., New York, N.Y.; Sartomer USA, LLC, Exton Pa.; and, Polysciences, Inc.

It will be appreciated that the SCC polymer may be obtained by a number of different methods. Mention may be made of: bulk polymerization; suspension polymerization; emulsion polymerization, including mini-emulsion polymerization; and, solution polymerization. In those embodiments where the SCC comprises a graft copolymer or a block copolymer, these may be prepared by first preparing a macromonomer which possesses terminal or pendant functional groups; the macromonomer is then reacted with the co-monomers of which the grafted chain or further block is constituted.

The coating materials comprising alkanes and/or side-chain crystalline polymers will typically further comprise adjuvants and additives that can impart improved properties to these materials. For instance, the adjuvants and additives may impart one or more of: prescriptive optical properties; longer enabled processing time; faster curing time; and, lower residual tack. Included among such adjuvants and additives are: plasticizers; stabilizers including UV stabilizers; antioxidants; reactive diluents; non-reactive diluents; drying agents; adhesion promoters; fungicides; flame retardants; rheological adjuvants; fillers; colorants; dyes; color pigments or color pastes; fluorescent materials; optical phase modifying materials; liquid crystals; infrared-reflecting materials; infrared-absorbing materials; ultraviolet-reflecting materials; ultraviolet-absorbing materials; optically refractive materials; and, optically diffractive materials.

Such adjuvants and additives can be used in such combination and proportions as desired, provided they do not adversely affect the nature and essential properties of the material. While exceptions may exist in some cases, these adjuvants and additives should not in toto comprise more than 50 wt. % of the total material and preferably should not comprise more than 20 wt. % of the material.

A "plasticizer" for the purposes of this disclosure is a substance that decreases the viscosity of the material and thus facilitates its processability. Herein the plasticizer may constitute from 0 to 10 wt. % or from 0 to 5 wt. %, based on the total weight of the coating material. When present, the plasticizer is preferably selected from the group consisting of: diurethanes; ethers of monofunctional, linear or branched C4-C16 alcohols, such as Cetiol OE (obtainable from Cognis Deutschland GmbH, Dusseldorf); esters of abietic acid, butyric acid, thiobutyric acid, acetic acid, propionic acid esters and citric acid; esters based on nitrocellulose and polyvinyl acetate; fatty acid esters; dicarboxylic acid esters; esters of OH-group-carrying fatty acids; glycolic acid esters; benzoic acid esters; phosphoric acid esters; sulfonic acid esters; trimellitic acid esters; polyether plasticizers, such as end-capped polyethylene or polypropylene glycols; polystyrene; hydrocarbon plasticizers; chlorinated paraffin; and, mixtures thereof.

"Stabilizers" for purposes of this disclosure are to be understood as antioxidants, UV stabilizers, thermal stabilizers or hydrolysis stabilizers. Herein stabilizers may constitute in toto from 0 to 10 wt. % or 0 to 5 wt. %, based on the total weight of the material. Standard commercial examples of stabilizers suitable for use herein include: sterically hindered phenols; thioethers; benzotriazoles; benzophenones; benzoates; cyanoacrylates; acrylates; amines of the hindered amine light stabilizer (HALS) type; and, mixtures thereof.

Examples of rheology modifiers that can be employed, alone or in combination, include: polyisobutylene, such as PIB85MM or PIB100MM available from Soltex; poly(alpha-olefins), such as products PAO2 to PAO100 available from Soltex; acrylic resins, such as PARALOID acrylic resins available from The Dow Chemical Company; and, ethylene vinyl acetate resins, such as ELVAX™ ethylene-vinyl acetate/acid copolymer resins available from E.I. duPont de Nemours and Company.

A need also occasionally exists to lower the viscosity of the coating material for specific applications by using non-reactive or reactive diluent(s). Exemplary diluents which may be alone or in combination, include: polyols; glycerol oil; and, POLYALDO™ polyglycerol ester diluents available from Lonza Group Ltd., Basel, Switzerland. The above aside, it is preferred that said diluents constitute in toto less than 10 wt. %, in particular less than 5 wt. % or less than 2 wt. %, based on the total weight of the material. In certain embodiments, the coating material is substantially free of diluents.

In some embodiments, the coating material may be further characterized by comprising less than 10 wt. % in particular less than 5 wt. % or less than 2 wt. %, based on the total weight of the material, of volatile organic compounds. In certain embodiments, the coating material is substantially free of volatile organic compounds.

To form the defined coating materials, the parts are brought together and mixed. It is important that the mixing homogenously distributes the ingredients within the material: such thorough and effective mixing can be determinative of a homogeneous distribution of any constituent particulate material or other adjunct material within the polymer matrix obtained following curing. As such, it will often be preferred that the elements are not mixed by hand but are instead mixed by machine—a static or dynamic mixer, for example—in pre-determined amounts without intentional photo-irradiation but optionally under heating.

In accordance with the broadest process aspects, the above described materials are applied to the substrate using the aforementioned printing apparatus and then solidified in situ. There is, for example, provided a rotary screen printing process, including the steps of a) releasing a liquefied coating material (15) at a pre-determined temperature ($T_R$) above the liquification point of the coating material into a conduit (11) which provides fluid communication to an internal volume of a rotating cylindrical screen (1), wherein the released liquefied coating material passes along the conduit (11) and is introduced into the internal volume of the rotating cylindrical screen; and, the introduced liquefied coating material first contacts an internal surface of the rotating cylindrical screen and is then brought into contact with a squeegee (6) which acts to impel the liquefied coating material through an array of apertures (100) provided in the rotating cylindrical screen, the squeegee being fixedly disposed in the internal volume of the cylindrical screen so that the squeegee does not rotate within the cylindrical screen as the cylindrical screen is rotating; c) determining one of the temperature of the conduit, the temperature of the liquefied coating material passing through the conduit or the temperature of the liquefied coating material discharged from the conduit to the internal volume of the rotary cylindrical screen using a second heat sensor; d) using a heater, heating the conduit so that the coating material maintains a second predetermined temperature ($T_C$) above the solidification point of the liquefied coating material as it passes through the conduit (11); e) contacting a printable substrate with an external surface of the rotating cylindrical screen so that liquefied coating material impelled through the apertures is transferred to the substrate; and, f) solidifying the transferred coating material on the substrate.

In an important embodiment, the liquified coating material (15) is released into the conduit (11) from a reservoir (200) and the process further comprises the preliminary steps of: introducing a coating material (15) into the reservoir (200); determining the temperature of the coating material (15) in the reservoir (200) using a first heat sensor (230) coupled to the reservoir; using a first heater (220), heating the coating material (15) held in the reservoir to the predetermined temperature ($T_R$) above the liquification point of the coating material (15).

Prior to applying the materials to the substrate into the printing process, it is often advisable to pre-treat the relevant substrate surfaces to remove foreign matter therefrom: this step can, if applicable, facilitate the subsequent adhesion of the materials thereto. Such treatments are known in the art and can be performed in a single or multi-stage manner constituted by, for instance, the use of one or more of: an etching treatment with an acid suitable for the substrate and optionally an oxidizing agent; sonication; plasma treatment, including chemical plasma treatment, corona treatment, atmospheric plasma treatment and flame plasma treatment; immersion in a waterborne alkaline degreasing bath; treatment with a waterborne cleaning emulsion; treatment with a cleaning solvent, such as acetone, carbon tetrachloride or trichloroethylene; and, water rinsing, preferably with deionized or demineralized water.

In some embodiments, the adhesion of the materials of the present disclosure to the preferably pre-treated substrate may be facilitated by the application of a primer thereto. Indeed primer materials may be necessary to ensure efficacious fixture and/or cure times of the materials on inactive substrates. The primer is deposited directly onto a substrate and is dried, cross-linked or otherwise hardened to form a continuous film. The skilled artisan will be able to select an appropriate primer.

The materials are then applied to the optionally pre-treated, optionally primed surfaces of the substrate. It is recommended that the material be applied to a surface at a wet film thickness of from 10 to 500 m. The application of thinner layers within this range is more economical and provides for a reduced likelihood of deleterious thick cured regions. However, great control must be exercised in applying thinner coatings or layers so as to avoid the formation of discontinuous cured films.

In some embodiments, the first or reservoir heater(s) and the second or conduit heater(s) of the rotary screen printing device are controlled so that the temperature ($T_A$) of the coating material is impelled through the apertures ($T_A$) of the rotating cylindrical screen is less than 2° C. or even less than 1° C. above the solidification point of the liquefied coating material.

The impelled coating material (15) applied to the substrate (14) is cured thereon: the material solidifies and sets upon the substrate. Where the temperature ($T_A$) of the coating material (15) being extruded from the apertures (100) of the rotary cylindrical screen (1) is sufficiently close to the solidification point of the coating material, supplementary cooling of the applied material need not be necessary.

However, in certain embodiments, it may be advantageous to accelerate the solidification of the coating material through cooling, in particular to obviate levelling flow of the liquid material on the substrate surface. The cooling step may be effected by any known method, including the gas quenching of coating material (15), the substrate (14) and/or the moving belt (12) which supports the substrate. A cooling rate of from 1 to 10° $Cs^{-1}$, for example from 1 to 5° $Cs^{-1}$ may be efficacious in some embodiments.

For the purposes of the present disclosure, the term "printable substrate" refers to any substrate which may be printed with a rotary screen printing process. In some embodiments, the printable substrate is a planar article having two major sides and outer edges defining a thickness, examples of which include sheets, films, webs or strips. The term "planar" is not meant to be limiting as to dimension or roughness of the substrate.

There is moreover no specific intention to limit the constituent material of the substrate which is to be printed. In some embodiments, the substrate comprises one or more layers wherein the material of each layer is independently selected from group consisting of: cellulosic fibrous materials, such as paper, paperboard, cardboard, cotton, linen, jute, ramie, industrial hemp or rayon; non-cellulosic fibrous materials, based on polyamide, polyester, polyacrylate, polyurethanes and/or vinyl-based fibers; blended fibrous substrates based on cellulosic and non-cellulosic fibers; polymeric resin; composites of polymeric resins with cellulosic and/or non-cellulosic fibrous material. It is understood in this context that the term "composite" includes materials in which the polymeric resin is in contact with the fibers but does not impregnate that fiber and alternative arrangements wherein the polymeric resin is partially embedded or partially impregnated in the fibers.

The term "paper substrate" refers to a substrate composed of a fibrous web of paper fibers and optionally papermaking additives such as: sizing agents; fillers, for example calcium carbonate or kaolin clay microparticles; wet-strength agents; and, optical brightening agents. The term "paper substrate" is intended to encompass uncoated, single-side coated or double-side coated paper substrates. Exemplary paper substrates include: Ahlstrom 601 Paper and 631 Paper, available from Ahlstrom Corporation; and, Whatman Grade 1 Paper, available from Whatman, Inc.

The apparatus and process of the present disclosure may be used to apply a coating material to a substrate to form a "monocoat" by which is meant a single layer coating that is devoid of additional coating layers: thus, the coating material can be applied directly to a substrate without any intermediate coating layer and cured to form a single layer coating. Alternatively, a coating material can be applied to a substrate as at least one coating layer in a multi-layer coating. Said multi-layer coating can comprise n coating layers, where n is at least 2, for example at least 3 or at least 4. It will be appreciated that there are a multiplicity of variations in the relative position of the coating layer(s) of such a multi-layer coating layer which may be applied by the described rotary screen apparatus.

As an illustrative example, the previously described solventless coating material may be applied as a basecoat in a multi-layer coating onto which additional basecoats and/or topcoats are applied. As used herein, a "basecoat" refers to a coating composition from which a coating is deposited either onto a primer or directly onto a substrate and which is then overcoated with at least a topcoat and optionally one or more tie-coats. The term "topcoat" references a coating deposited form a coating composition which is disposed as the final layer of a series of coating layers. The topcoat may be in contact with the external environment in the final composite structure but need not necessarily be so as laminates are envisaged as being within the scope of the present disclosure. For completeness, the term "laminate" means a first substrate, such as the coated substrate described above, that is further covered with a second, laminating substrate.

The laminating substrate may be applied in a manner whereby the first or coated substrate and the second, laminating substrate—typically a film or a sheet—are adhered over at least a portion of their contacted surfaces, for example employing an adhesive, heat or a combination thereof.

The coating layers of a multi-layer coating—which are disposed either below or above the coating layers which are applied using the described rotary screen apparatus—may be applied by any known method. This includes the application of such layers by a rotary screen apparatus which does not possess the heated conduits described herein. It is further considered that these coating layers may be applied: in a dry-on-dry process, wherein a coating composition is dried or cured to form a coating layer prior to the application of a further coating composition thereon; in a wet-on-wet process, where coating compositions are applied sequentially but are dried or cured together; or, in a combination of these processes.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Also, it should be appreciated that the features of the dependent claims may be embodied in the systems, methods, and apparatus of each of the independent claims.

Many modifications to and other embodiments of the invention set forth herein will come to mind to one skilled in the art to which these inventions pertain, once having the benefit of the teachings in the foregoing descriptions and associated drawings. Therefore, it is understood that the inventions are not limited to the specific embodiments disclosed, and that modifications and other embodiments are intended to be included within the scope of the appended claims. Although specific terms are employed herein, they are used in a generic and descriptive sense only and not for purpose of limitation.

The invention claimed is:

1. A rotary screen printing process, comprising:

introducing a coating material into a reservoir;

determining a temperature of the coating material in the reservoir using a first heat sensor coupled to the reservoir;

using a first heater, heating the coating material held in the reservoir to a first predetermined temperature above a liquefication point of the coating material so that the coating material is liquefied;

releasing the liquefied coating material at the first predetermined temperature into a conduit which provides fluid communication to an internal volume of a rotating cylindrical screen, wherein the released liquefied coating material passes along the conduit and is introduced into the internal volume of the rotating cylindrical screen; and, the introduced liquefied coating material first contacts an internal surface of the rotating cylindrical screen and is then brought into contact with a squeegee which acts to impel the liquefied coating material through an array of apertures provided in the rotating cylindrical screen, the squeegee being fixedly disposed in the internal volume of the cylindrical screen so that the squeegee does not rotate within the cylindrical screen as the cylindrical screen is rotating;

determining one of a temperature of the conduit, the temperature of the liquefied coating material passing through the conduit, or the temperature of the liquefied coating material discharged from the conduit to the internal volume of the rotary cylindrical screen using a second heat sensor;

using a second heater, heating the conduit so that the coating material maintains a second predetermined temperature above a solidification point of the liquefied coating material as the liquefied coating material passes through the conduit;

contacting a printable substrate with an external surface of the rotating cylindrical screen so that the liquefied coating material impelled through the apertures is transferred to the printable substrate; and, solidifying the transferred coating material on the printable substrate.

2. The printing process according to claim 1, wherein the second heater is controlled so that the liquefied coating material impelled through the apertures of the rotating cylindrical screen is less than 1° C. above the solidification point of the liquefied coating material.

3. The printing process according to claim 1, wherein the first heater and the second heater are controlled so that the liquefied coating material impelled through the apertures of the rotating cylindrical screen is less than 1° C. above the solidification point of the liquefied coating material.

4. The printing process according to claim 1, wherein the coating material is substantially free of solvent.

5. The printing process according to claim 4, wherein the coating material comprises a side-chain crystalline polymer.

6. The printing process according to claim 4, wherein the coating material comprises an alkane.

7. A printed substrate obtained using the process defined in claim 1.

8. A substrate according to claim 7 having printed thereon a coating material comprising at least one of a side-chain crystalline polymer and.

9. A substrate according to claim 7 having printed thereon a coating material comprising an alkane.

10. The printing process according to claim 1, wherein the second predetermined temperature is lower than the first predetermined temperature.

11. The printing process according to claim 1, wherein the second predetermined temperature is lower than the liquefication point of the coating material.

12. The printing process according to claim 1, wherein the first predetermined temperature is from 0.1 to 5° C. above the liquefication point of the coating material.

13. The printing process according to claim 1, wherein the first predetermined temperature is from 0.1 to 2° C. above the liquefication point of the coating material.

14. The printing process according to claim 1, wherein the first predetermined temperature is from 0.1 to 1° C. above the liquefication point of the coating material.

15. The printing process according to claim 1, wherein the second predetermined temperature is from 0.1 to 2° C. above the solidification point of the coating material.

16. The printing process according to claim 1, wherein the second predetermined temperature is from 0.1 to 1° C. above the solidification point of the coating material.

17. The printing process according to claim 1, wherein the second predetermined temperature is from 0.1 to 0.5° C. above the solidification point of the coating material.

* * * * *